US010548117B2

(12) United States Patent
Leroux et al.

(10) Patent No.: US 10,548,117 B2
(45) Date of Patent: Jan. 28, 2020

(54) APPARATUS AND METHOD FOR OS AGENT TO OPTIMIZE TRANSMISSION OVER THE AIR

(71) Applicants: Philippe Leroux, Ottawa (CA); Aaron James Callard, Ottawa (CA)

(72) Inventors: Philippe Leroux, Ottawa (CA); Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/388,802

(22) Filed: Dec. 22, 2016

(65) Prior Publication Data

US 2018/0184416 A1 Jun. 28, 2018

(51) Int. Cl.

| | |
|---|---|
| ***H04L 12/28*** | (2006.01) |
| ***H04W 72/04*** | (2009.01) |
| ***H04L 29/08*** | (2006.01) |
| *H04W 88/02* | (2009.01) |

(52) U.S. Cl.

CPC ......... *H04W 72/0413* (2013.01); *H04L 67/02* (2013.01); *H04L 67/06* (2013.01); *H04W 88/02* (2013.01)

(58) Field of Classification Search

CPC ............. H04L 63/0428; H04L 63/0227; H04L 63/0281; H04L 63/04; H04L 63/10; H04L 63/168; H04L 47/19

See application file for complete search history.

(56) References Cited

U.S. PATENT DOCUMENTS

| | | | | |
|---|---|---|---|---|
| 6,219,704 | B1 * | 4/2001 | Kim | H04L 12/5602 709/224 |
| 8,433,783 | B2 * | 4/2013 | Jackowski | H04L 47/19 370/469 |
| 9,781,082 | B2 * | 10/2017 | Martini | H04L 63/04 |
| 2013/0333018 | A1 | 12/2013 | Doukhvalov et al. | |
| 2016/0156983 | A1 | 6/2016 | Vong et al. | |

FOREIGN PATENT DOCUMENTS

CN 105162626 A 12/2015

OTHER PUBLICATIONS

International Search Report dated Sep. 27, 2017 for corresponding International Application No. PCT/CN2017/098081 filed Aug. 18, 2017.

* cited by examiner

*Primary Examiner* — Hanh N Nguyen

(57) ABSTRACT

An apparatus and method for optimizing connections' transmission over the air (OTA) between a user equipment (UE) and a telecommunication network. The telecommunication network includes an operating system (OS) agent residing on the RAN side of the OTA interface, wherein the OS agent is configured to analyze data from/to user equipment (UE). The OS agent is configured to provide metadata of downlink data to the RAN and to apply required transmission protocol's algorithm for the uplink data. Further, the OS agent can contain the UE's OS libraries specific of encrypted protocol to allow the OS agent to decrypt encrypted received data for processing before OTA transmission.

20 Claims, 10 Drawing Sheets

APPARATUS AND METHOD FOR OS AGENT TO OPTIMIZE TRANSMISSION OVER THE AIR

FIELD OF THE INVENTION

The present invention relates generally to the generally to the field of optimizing over the air (OTA) data flows, and more particularly to an apparatus and method for optimizing, by a UE configured entity residing on the other side of the OTA link the transmission of various data flows and encrypted data flows.

BACKGROUND

In telecommunications, over the air transmission (OTA), otherwise known as wireless transmission, is a primary communication system between user equipment (UE) and a network. UEs are devices like mobile phones (handsets), WLL phones, computers with wireless Internet connectivity. The network can be that of any of the wireless communication technologies like GSM, CDMA, wireless local loop, Wi-Fi, WiMAX or other wide area network (WAN) technology. The use of OTA is increasing rapidly. With this increase, the need to optimize the dat flow is also increasing.

Moreover, the use of various encryption protocols, such as https and QUIC, is increasing. The main motivation for this increase is the authentication of visited websites and the protection of privacy and integrity of the exchanged data. This use of protocols, however, can prevent packet analysis, such as deep packet inspection (DPI), which would allow the Radio Access Network (RAN) to optimize how those packets are transmitted over the air (OTA).

Without the packet analysis, when packets arrive at the RAN, either user equipment (UE) side or Access node (AN) side, the RAN has little knowledge on how various packets form an object, such as image file, text file, video file, I-Frame, single message, application update, etc. Therefore, it cannot chose the method to reliably and with the lowest latency desired, push the objects/packets to the user equipment (UE), i.e. any device used directly by an end-user to communicate, such as a hand-held telephone, a laptop computer equipped with a mobile broadband adapter, or any other device.

There is a need for a method and related system to allow for optimization of connections' transmitted OTA.

SUMMARY

The present invention satisfies the needs set out above and relates generally to the field of optimizing OTA data flows, and more particularly to an apparatus and method for optimizing, by a UE configured entity residing on the other side of the OTA link the transmission of various data flows and encrypted data flows.

For purposes of this application, radio access network (RAN) is defined as being the entity governing how the data is processed to be transmitted over the air, and as such, it includes access nodes (such as eNobeB, gNB) and parts of user equipments (UE) configured to access the OTA interface. A RAN node is understood as either the AN or the RAN part of the UE.

In accordance with embodiments of the present invention, there is provided a RAN node having an operating system (OS) agent residing on the AN side of the OTA interface. The OS agent is configured to analyze data from/to user equipment (UE) and to provide metadata of this data to the RAN. The metadata can include object boundaries, relative importance of the objects, quality of service marking of individual packets, and marking of which object each packet belongs to. The OS agent can further include the UE's OS libraries specific of encryption protocol. The OS agent can be configured to receive from the UE an SSH Key to allow the OS agent to decrypt encrypted received data for processing before OTA transmission, as well as to receive from the UE the configuration to connect to the application server with the SSH Key to further process the received data for OTA transmission. The use of an SSH Key is illustrative and not meant to be to limiting. Those skilled in the art will recognize that other types of encryption protocols are within the scope of this invention.

In accordance with embodiments of the present invention, there is provided user equipment (UE) configured to provide a session request leading to the creation of an operating system (OS) agent residing on the AN side of the OTA interface. The UE can also be configured to provide information to an operating system (OS) agent residing on the AN side of the OTA interface.

In accordance with embodiments of the present invention, there is provided a RAN providing telecommunications capabilities, both uplink and downlink, having a protocol and/or interface to be informed of, as needed, object boundaries, object importance, object dependence, class of quality of service indicator (CQI).

In accordance with embodiments of the present invention, there is provided a RAN node having an operating system (OS) agent residing on the AN side of the OTA interface, wherein the OS agent is configured to interact with a destination node not a source node.

In accordance with embodiments of the present invention, there is provided an apparatus for optimization of connections' transmitted OTA. In this aspect, the system includes an operating system (OS) agent residing inside the radio access network (RAN) of the telecommunication network. The OS agent is configured to analyze data to/from the UE and to provide metadata of this data to the RAN. The metadata can include object boundaries, relative importance of the object boundaries, quality of service marking (QCI) of individual packets, and marking of received packets to which object each received packet belongs. Further, the OS agent can remodel the received packet flows and then separate objects into new market packets in which to differentiate the objects.

In accordance with embodiments of the present invention, there is provided an apparatus for optimization of encrypted connections' transmitted OTA. In this aspect, the apparatus includes an operating system (OS) agent residing inside the AN side of the telecommunication network. The OS agent contains user equipment (UE) OS libraries specific of encrypted protocol.

In accordance with embodiments of the present invention, there is provided an apparatus for optimization of connections' transmitted OTA. In this aspect, the apparatus includes an operating system (OS) agent residing on the AN side of the OTA interface. The OS agent can be configured to receive packets in a first protocol and translate the received packets into a second protocol.

According to embodiments of this apparatus, the connection between the OS agent and RAN can support loss free transmission. Further, there can be an OS raw object interface connecting a OS raw object stream from user equipment to the OS agent.

In accordance with embodiments of the present invention, there is provided a method for optimizing connections' transmission over the air (OTA) between user equipment (UE) and a telecommunication network. The telecommunication network has an operating system (OS) agent residing on the AN side of the OTA interface. In this aspect, the OS agent is configured to analyze downlink data to the UE and to provide metadata of this data to the RAN.

In accordance with embodiments of the present invention, there is provided a method for optimizing connections' transmission over the air (OTA) between user equipment (UE) and a telecommunication network. The telecommunication network has an operating system (OS) agent residing on the AN side of the OTA interface. In this aspect, the OS agent is configured to apply required transmission protocol's algorithm, such as pacing, encryption etc., for uplink data from the UE.

This aspect of the inventive method can further include routing non-analyzed incoming packets before the AN. The OS agent then analyzes, by deep packet inspection (DPI) or other comparable method, the content of the incoming packets and marks each analyzed incoming packet with a quality of service. The OS agent then provides the marked packets to the RAN node. The marking can include object boundaries information. The packet protocol of the incoming packets is TCP or UDP.

In another aspect of the inventive method when the OTA transmissions are encrypted connections and when the OS agent contains the UE's OS libraries specific of encrypted protocol, the method can include the OS Agent receiving a SSH Key of session from UE and decrypting the received packets. In another aspect, a subset of packets are decrypted and analyzed in the UE and the remainder of the packets are decrypted and analyzed by the OS agent.

According to embodiments of this method, another aspect has the OS agent reordering the received packets in stream and then generating multiple streams, one for each HTML, object. The OS Agent then schedules each of the multiple streams to be optimized for latency. The OS Agent then provides the optimized packets to the RAN node.

According to embodiments of this method, another aspect has encrypted and non-analyzed traffic, representing different objects, routed to the MEC before the AN. The OS Agent decodes and differentiates each object in order to analyze them. Each analyzed object is then forward by the OS Agent to the RAN. The RAN determines how to re-encode each analyzed object and schedules each re-encoded object to optimize their OTA transmission's latency according to indication of quality of service per objects received from the OS Agent.

According to some embodiments, the OS Agent is in a dedicated MEC server and communicates through streams via network links to the RAN. In other embodiments the OS Agent runs on the same RAN hardware and shares streams, packets or objects to the RAN for transmission via shared memory.

According to embodiments of this method, a portion of the packets can be first transmitted directly through the RAN, decrypted and analyzed in the UE, which trigger the UE to then configure the OS Agent to further process the remaining packets, in the desired manner, before the RAN processes them.

BRIEF DESCRIPTION OF THE FIGURES

Further features and advantages of the present invention will become apparent from the following detailed description, taken in combination with the appended drawings, in which.

DETAILED DESCRIPTION

In general, the present invention is generally to the field of optimizing OTA data flows, and more particularly to an apparatus and method for optimizing, by an operation system agent (OS agent) which is a UE configured entity and residing on the other side of the OTA link, the transmission of various data flows, i.e. the collection of packets that are identifiable to a particular flow, and encrypted data flows.

In general, the OS agent interface with the RAN node functionality will optimize OTA traffic forwarding. Further, when the OS agent applies an encryption protocol, such as HTTPs, QUIC, FTP, TCP, the OS agent knows what data is received and is able to identify the priority for forwarding the traffic OTA to enforce quality of service (QoS) and quality of experience (QoE) at the UE device. This will put the end to end encryption protocol lawyer past the OTA link that lies between the UE and network.

Figure 2:
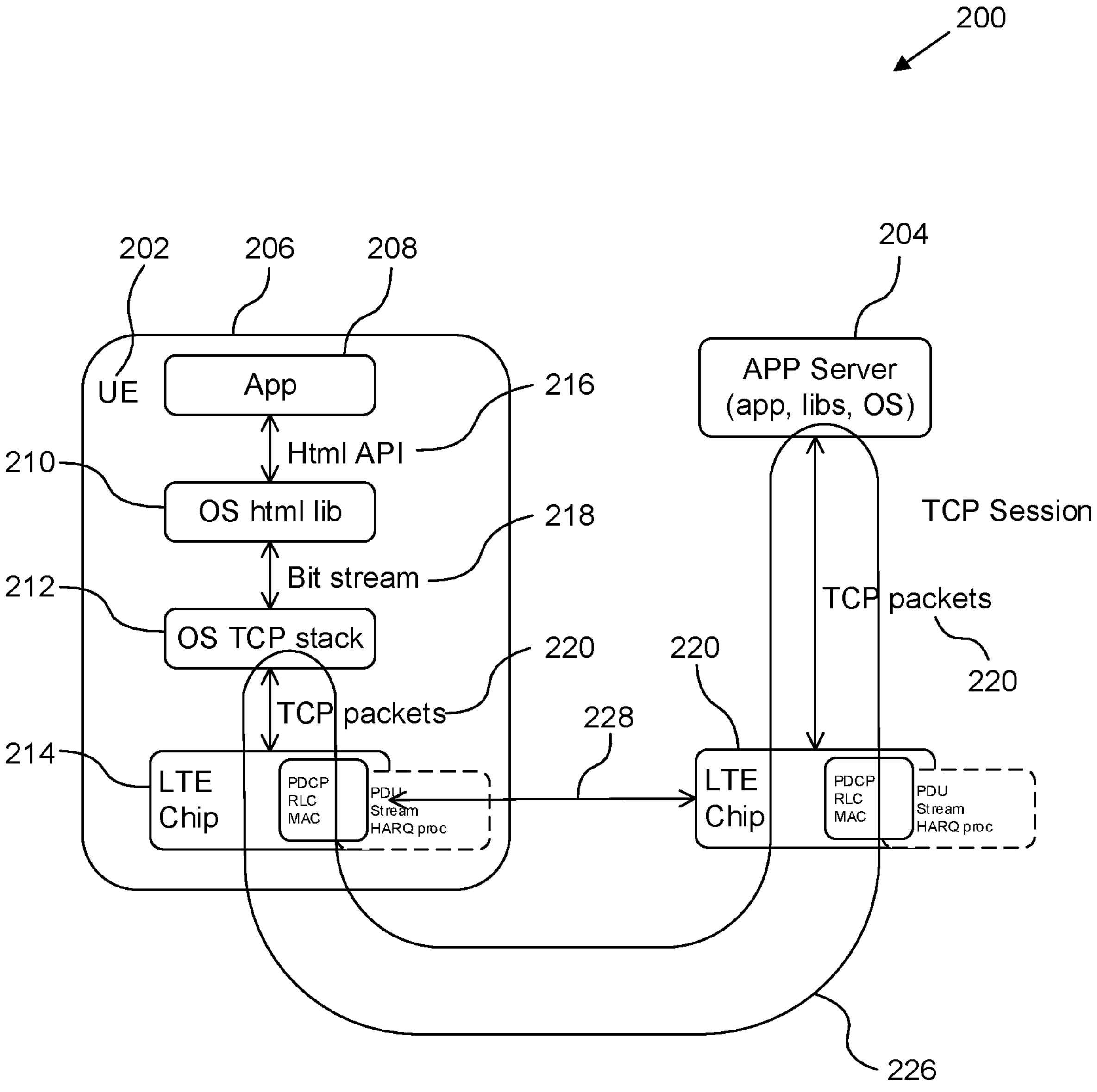
FIG. 2 is an illustrative schematic of the nodes at play with respect to the present invention.

In FIG. 2, a prior art schematic illustration of the current interface 200 between the UE 202 and the application server 204 is shown. The UE stack 206 includes an application 208, OS html library 210, OS TCP stack 212 and an LTC chip 214. The use of the TCP protocol is merely illustrative and not meant to be limiting. An application program interface (API) 216 connects the application 208 with the OS html library 210. Data from the OS html library 210 (queries, objects, etc.) is sent to the OS TCP stack 212 as a stream of bits 218. Some forms of Encryption (SSH, TLS) occurs between the OS html library 210 and the OS TCP stack 212. The OS TCP stack 212 converts this stream into TCP packets 220 over a TCP session 226 which ends in the application server. The TCP packets 220 are provided to the LTE chip 214 for transmission OTA 228 to the an LTE chip 220 located on the network side of the OTA link. These encrypted TCP packets 220 are then delivered to the Application Server 204 over a network not shown. The encrypted data originates in the UE 202, is transmitted OTA to the network where it is provided to the Application Server 204.

Figure 1:
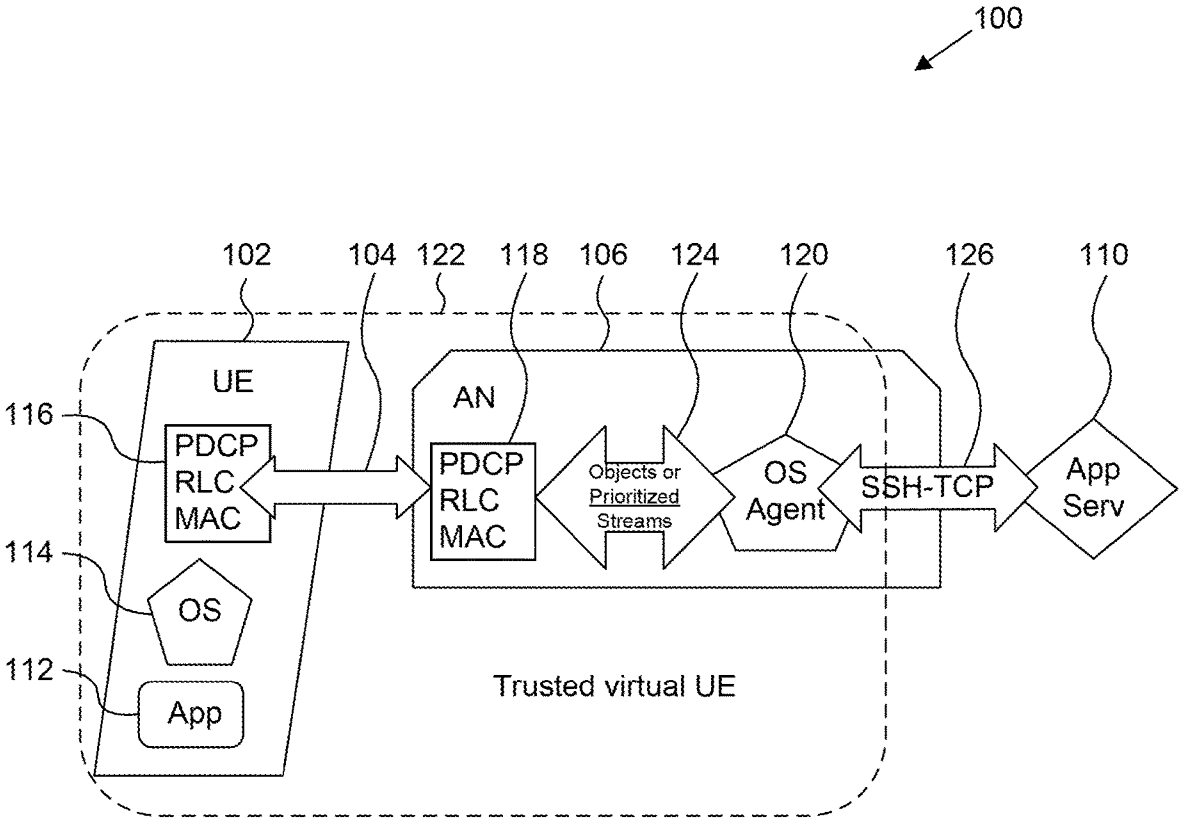
FIG. 1 is an illustrative diagram of the current end-to-end protocol stack.

As shown in FIG. 1, a general overview 100 of the nodes involved in the present invention is illustrated for the downlink. Similar reciprocal methods can be used in the uplink. Overview 100 illustrates a user equipment UE 102 having an OTA connection 104 with a AN 106 located on network side of the OTA connection 104. The AN 106 is in communication through an interface 126 with an application server 110. Within the UE 102 are applications 112, operating system 114 and various hardware and OTA transmission protocol stack (e.g. PDCP/RLC/MAC in LTE) 116.

Within the AN 106 are various hardware and transmission protocols 118 and OS Agent 120. The OS agent 120, operating on the AN 106 side, is configured to analyze data from/to UE 102. In the case of downlink data, the OS agent 120 is configured to provide metadata of this data to the AN 106 via the interface 124. The metadata can comprise object boundaries, relative importance of the objects, quality of service marking of individual packets, and marking of which object each packet belongs to, delay bounds on objects, dependencies between objects, etc.

The OS Agent 120 can provide meta data about the various packets to the AN part of the RAN, to enable it to appropriately prioritize packets. Objects or prioritized streams pass between the transmission protocols 118 and the OS Agent 120. The OS Agent 120 and application server 110 are in communication through a protocol 126, such as TCP or UDP over SSH, QUIC, HTTPS or the like.

In the case of uplink data, the OS Agent 120 is configured to reconstruct a data stream for communication on the network side, such as to a network node, application server, cloud, etc., from the UE 102, including applying pacing of sending packets of the objects adequately, such as enabling TCP slow start or the like, after the OTA transmission. Thus the Application server 110 is unaware, or at least need not be aware of the OS agent's 120 involvement.

Furthermore, to interact with the App server 110 the OS Agent 120, when obtaining the first packets of, or all the object, will apply required transmission protocol's algorithm such as pacing, encryption etc. This allows for good performance over, and backwards compatibility over the interface 126. Additionally, the OS agent 120 contributes to lower the roundtrip time to the network node the UE 102 communicates with by shaving off the OTA portion of the latency due to data flows being more optimal as such transport protocol is sensitive to OTA varying latencies.

The UE 102 or UE's OS 114 may communicate with it's OS Agent 120 on the AN 106 side of the OTA via a virtual connection for purposes of control and or configuration. Since the protocol used to exchange data between the OS 114 to the OS agent 120 can be very different from that between the OS 114 and the App server 110, the OS 114 configures the OS agent 120 to use the desired protocols to translate into for communication with the App server 110.

The OS 114 in the UE 102 also exposes to the RAN via the metadata interface, information regarding the data exchanged. For example, the request for accessing the OTA via a scheduling request (SR) by the UE 102 is separated from the actual transfer of data. Typically the upper layer (IP) indicate that there is data to send by push data into that wireless interface. This would then build up a buffer, which is then indicated to the AN 106 through OTA signaling such as scheduling request and the like. In this approach the OS 114 provides an intent to transmit which may be much larger than the supported buffer of that interface. The interface then provides that intention to transfer as a virtual buffer size OTA. In this way, it exposes all the data to be transmitted to the AN in one explicit transmission request, or scheduling request, without having to indicate the buffer status over many scheduling requests that would otherwise be exposed in the transmission request, thus enabling the RAN to improve OTA transmission for all served UEs while not disrupting packet flows on the network side.

In one embodiment, the OS uses rewritten libraries to directly translate (for the uplink) HTTP or other type of protocols into data and meta-data to interface with the UE side of the RAN 116. In another embodiment, a function like the OS Agent 120 is used to intercept the OS 114 data streams and translate them with metadata for the RAN side of the UE 102, where the UE/OS 114 configures this agent in a very similar way as it would configure the one residing on the AN 106 side of the RAN.

Further, the OS Agent 120 can emulate the OS libraries specific to the UE's protocols, such as those in charge of encryption. In one scenario the encryption keys are negotiated by the UE. The OS agent 120 then receives from the UE an encryption Key to allow the OS agent 120 to decrypt encrypted received data for processing before OTA transmission and to receive from the UE 102 the configuration to interact with the application server with the encryption Key to further receive and process data for OTA transmission. This allows for the creation of a trusted virtual UE 122, for the chosen traffic, a virtualized entity with which the app server interacts.

Figure 3:
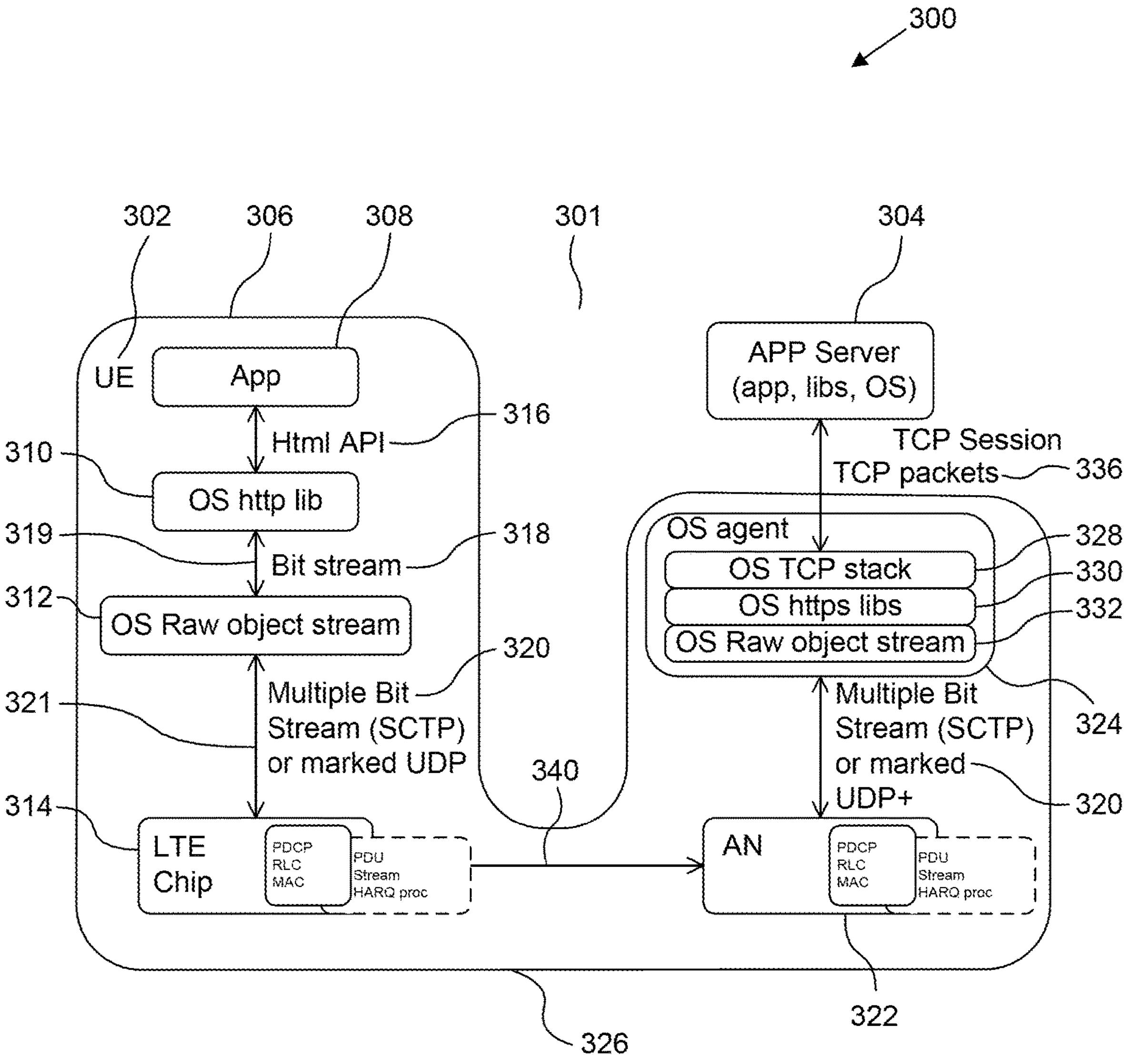
FIG. 3 is an illustrative diagram of an embodiment of an extended end-to-end protocol stack of the present invention.

In FIG. 3 is illustrated a schematic illustration 300 of the interface 301 between the UE 302 and the application server 304 is shown. The extended UE stack 306 includes, on the UE side, an application 308, OS html library 310, OS Raw object stream 312 and an LTE chip 314, and on the network side, an OS Agent 324 and a AN node 322. The OS Agent 324 includes an OS TCP Stack 328, OS https library 330 and an OS Raw object stream 332. The connection between the OS agent 324 and AN node 322 may or may not support loss free transmission.

An application program interface (API) 316 connects the application 308 with the OS http library 310. Data from the OS html library 310 is sent to the OS Raw object stream 312 in the form of a bit stream 318 through library interface 319. Data from the OS Raw object stream 312 is sent to the LTE chip 314 through a OS Raw object interface 321 and is then pushed to the OS Agent 324 through an OTA link 340. This data is in the form of multiple objects 320. During a TCP Session 326, the received data is encrypted into TCP packets 336 by the OS Agent 324 are then provided to the Application Server 304.

There are many ways in which the OS Raw object interface 312, could be implemented. The interaction may be fundamentally packet or stream based. Typical wireless interfaces (LTE, GSM etc) support packet based processing. In this environment a block of data is sent to the LTE chip 314 and that entire block of data is recreated on the other side of the OTA link 340. In a stream based interface, however, the data is sent to the OS Raw object interface 312, most likely as blocks of data and then the other side of the OTA link 340, the recreated data may have been combined with the portions of earlier or later packets, i.e the recreated data may not have the same boundary as the data on the UE side of the OTA link 340. In LTE/5G this could be performed by having the PDCP provide the packets as it to upper layers without performing re-assembly.

In some embodiments the interface may be a protocol over IP such as QUIC, MP-TCP, SCTP, or UDP. The mapping of IP into radio bearers is then used using normal processes. Each IP packet may have QoS class indicator (QCI) marked traffic. This interface can have multiple characteristics. In the lowest form, the interface is just IP packets from UE to the OS Agent. In another embodiment, it can be a separate control on a separate radio bearer with a separate data on MBB radio bearer. In another embodiment, the interface's characteristics can be multiple UDP sessions with marked QCI. In yet another embodiment, the characteristics can be a session with object identification flags, such as object boundaries information, object priority class, object reordering policies, object delay requirement. In yet another embodiment, the characteristics can be marked IP packets with an advanced queuing configuration script. Or in embodiments where the OS Agents is instantiated inside the eNodeB/gNB, and/or inside a UE between the OS and the LTE/5G chip, the interface could be shared memory with pointers and data structures shared directly to be streamlined by the RAN for OTA transmission with knowledge of the object boundaries and dependencies.

The Raw object interface 320/321 enables the AN node 322 to adequately prioritize OTA data. For example, since an incomplete portion of an html object is unusable, the RAN node, including the AN node 322 can prioritized data of fully received (at portions of the RAN node such as the LTE chip 314 or the AN node 322 for uplink/downlink respectively) html objects over partly received html objects; further the AN node 322 can pace the streaming of a video clip object; and still further, the AN node 322 can lower the priority of objects such as an animated GIF having a lower priority until another event occurs, such as the gif image triggered by user action. The Raw object interface 321 allows for the RAN node, including the LTE chip 314 or the AN node 322 to apply fountain coding on object boundaries for object that are useless if not fully received. Further the Raw object interface 321/320 allows the RAN node, including the LTE chip 314 and/or the AN node 322 to optimize retransmission in RLC/PDCP by possibly giving up such retransmission of bits belonging to fountain-coded objects and knowing precisely how many more fountain-coded fragments of that object must still be transmitted for complete recovery at the other end of the OTA interface 340.

There are several ways that the object boundaries can be indicated over the OS Raw object interface 321. A first way is the encapsulation of IP to indicate object boundaries. In this solution, one IP packet corresponds to one upper layer object. To allow for transfer of objects, IP fragmentation may be used to indicate that multiple fragments belong to the same IP packet, and thus the same object. Modification of standard IP behavior may be required to deal with objects larger than 2^16 bytes in size. A second way includes the encapsulation of packets in an encapsulation protocol. This protocol can include a field indicating object ID. All packets with the same object ID are presumed to be the same object. Additional information such as fragment ID can also be provided (i.e. fragment 1 of 20, fragment 2 of 20). Special 'end' and/or 'begin' packets can indicate that a packet is the last or first packet in this object. A third way is to provide information over the control plane indicating fields in transport protocols. This may correspond to sequence number fields in TCP (or similar protocol) headers. For instance sequence 100 000-150 000 is an object. Similar approaches can be applied to packet based protocols like DCCP or others.

Object boundaries refer to characteristics of an object such as the type of object, i.e. an image, and whether the decoding of the object to begin when the first packets have arrived but before all the packets have arrived, i.e. a streaming type of object, or conversely that all packets must arrive before decoding begins. Examples of object boundary information can include notifications such as the subject object is made up of packets 10-20, 30-50, an indicator placed within the packet header that states this packet is part of object 10 and is the last packet, etc. Other metadata which may be provided is object precedence, such as object A is not useful before object B. Thus even if object B is fully ready to be sent OTA, packets in object A should still take precedence.

On the interface 322 or 321 between the RAN parts 322/314 and the OS Agent 324 or the UE's OS part 312, there can be also a feedback mechanism for the RAN to inform the entities providing metadata of the RAN's status. This may be a buffer report of the RAN indicating buffer bloat, or a delay or latency to access the OTA transmission, or the ability for the RAN's buffer to accept the data or part of the data of the one or more objects. The RAN may also inform of capabilities, or the lack of, to handle requested QoS, or may inform a change of this capabilities (which may be due to other flows/other UEs/other OS Agents' demands).

In operation, this embodiment improves the quality of service (QoS) and quality of experience (QoE). With the OS Agent 324 on the network side, the HTTPS stream is decoded at the agent beyond the OTA link. The OS Agent 324 is able to decide how to forward what data to the RAN node, including the AN node 322. Additionally, the OS Agent 324 can push data into multiple streams of the RAN node, including the AN node 322 (Radio access bearers or priority queues) according to the importance of each piece of information. These streams can be provided with priorities for the RAN to optimize data selection for OTA transmission, and these priorities can be dynamically changed by the OS agent 324.

In another embodiment, an apparatus to optimizing OTA transmission between a UE 302 and a telecommunication network having a RAN node is disclosed. This apparatus comprises an OS agent residing on one or both side of the wireless link interface (i.e. the RAN). The OS agent 324 is configured to analyze data for and from the UE and to provide metadata from the analyzed data to the RAN. The metadata comprises object boundaries, relative importance of the object, quality of service marking of individual packets and/or flows, and marking of received packets to which object each received packet belongs.

In another embodiment of the system of present invention, an apparatus to optimizing OTA transmission between a UE and a telecommunication network having a RAN node is disclosed. This apparatus comprises an OS agent residing on the AN side of the OTA interface. The OS agent is able to emulate the behavior of the UE's OS libraries and configurations specific of encryption protocol which allows the OA agent to decrypt end to end transmissions when there are encrypted connections. Further, this embodiment can further comprise an OS raw object interface connecting an OS raw object stream from user equipment to the OS agent.

In another embodiment of present invention, an apparatus to optimizing OTA transmission between a UE 302 and a telecommunication network having a RAN node is disclosed. This apparatus comprises an OS agent 324 residing on the AN side of the OTA interface. The OS agent 324 is configured to inform the AN 322 that where one object starts and end. Still further, the OS Agent 324 can inform the RAN that an object is more important than other objects, or that an object is not useful unless fully received, or dependent on other objects, hence allowing the RAN to prioritize other objects. This allows for an improved time to completion of DL traffic. Knowing the boundaries of objects, it can reencode them with adequate FEC code (or let the RAN do such) that maximizes the performance of transmitting them with different FEC codes for each to prevent one not fully transmitted object to block decoding of another one at the UE.

Figure 4:
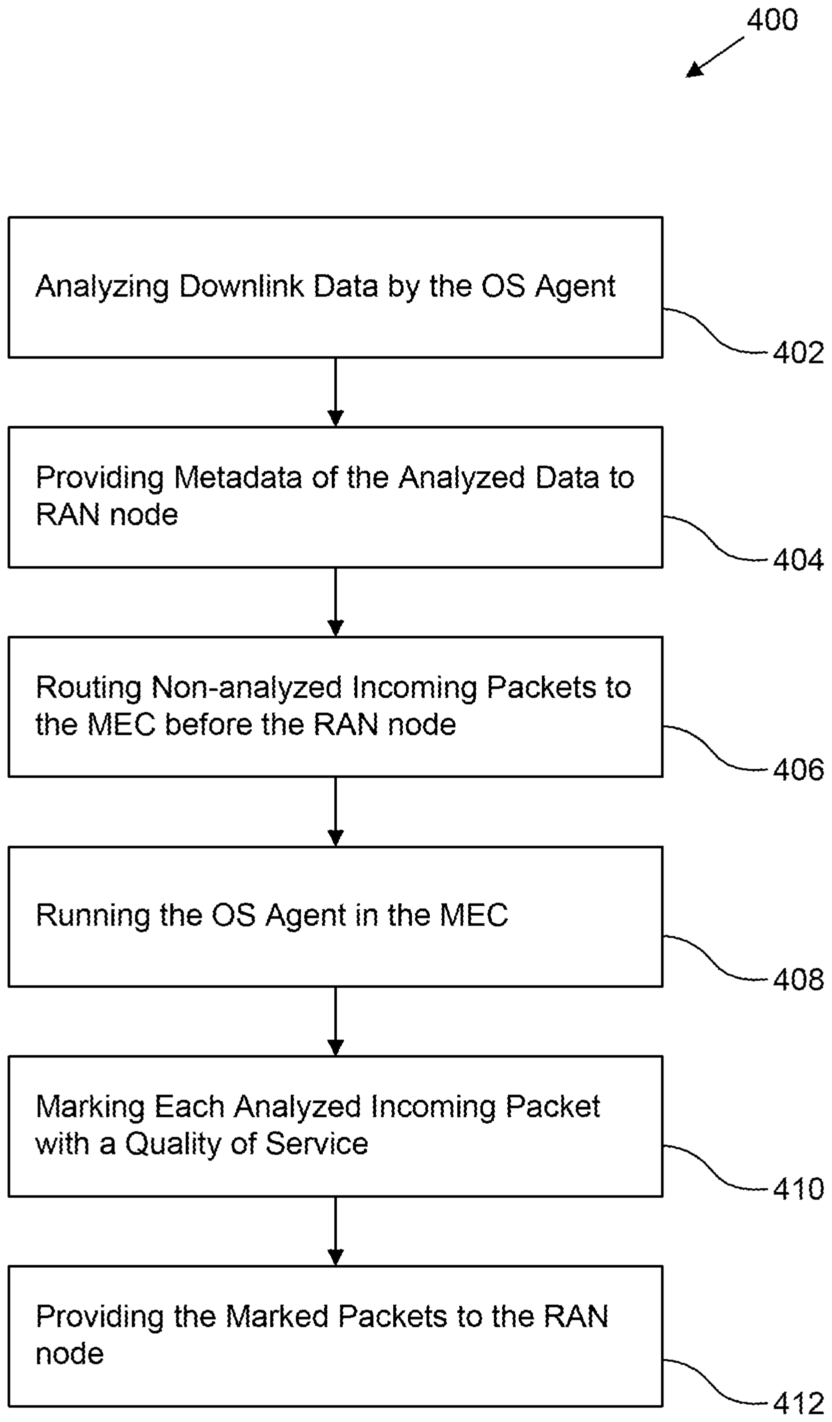
FIG. 4 is an schematic flowchart of an embodiment of method the present invention.

As illustrated in FIG. 4, an embodiment 400 of the method for optimizing encrypted connections' transmission OTA between UE and a telecommunication network is shown. This method utilizes the system set out above, namely having an OS agent residing inside of the telecommunication network, wherein the OS agent is configured to analyze downlink data for the UE and to provide metadata to the RAN. The method comprising analyzing downlink data by the OS Agent 402 and providing metadata of the analyzed data to RAN node 404.

This embodiment can also include the steps of routing non-analyzed incoming packets to the MEC before the AN 406, running the OS Agent in the MEC 408, marking, by the OS Agent, each analyzed incoming packet with a quality of service 410; and providing, by the OS Agent, the marked packets to the AN 412. The marking can include object boundaries information. The packet protocol of the incoming packets can TCP, UDP or other protocol know by those skilled in the art. The step of analyzing can be performed by deep packet inspection (DPI), or be performed as part of a proxy behavior of the OS agent, by which is meant that as the OS agent is acting as an upper layer proxy it is very capable of knowing what information is in each packet as it generated that information at that upper layer.

Figure 5:
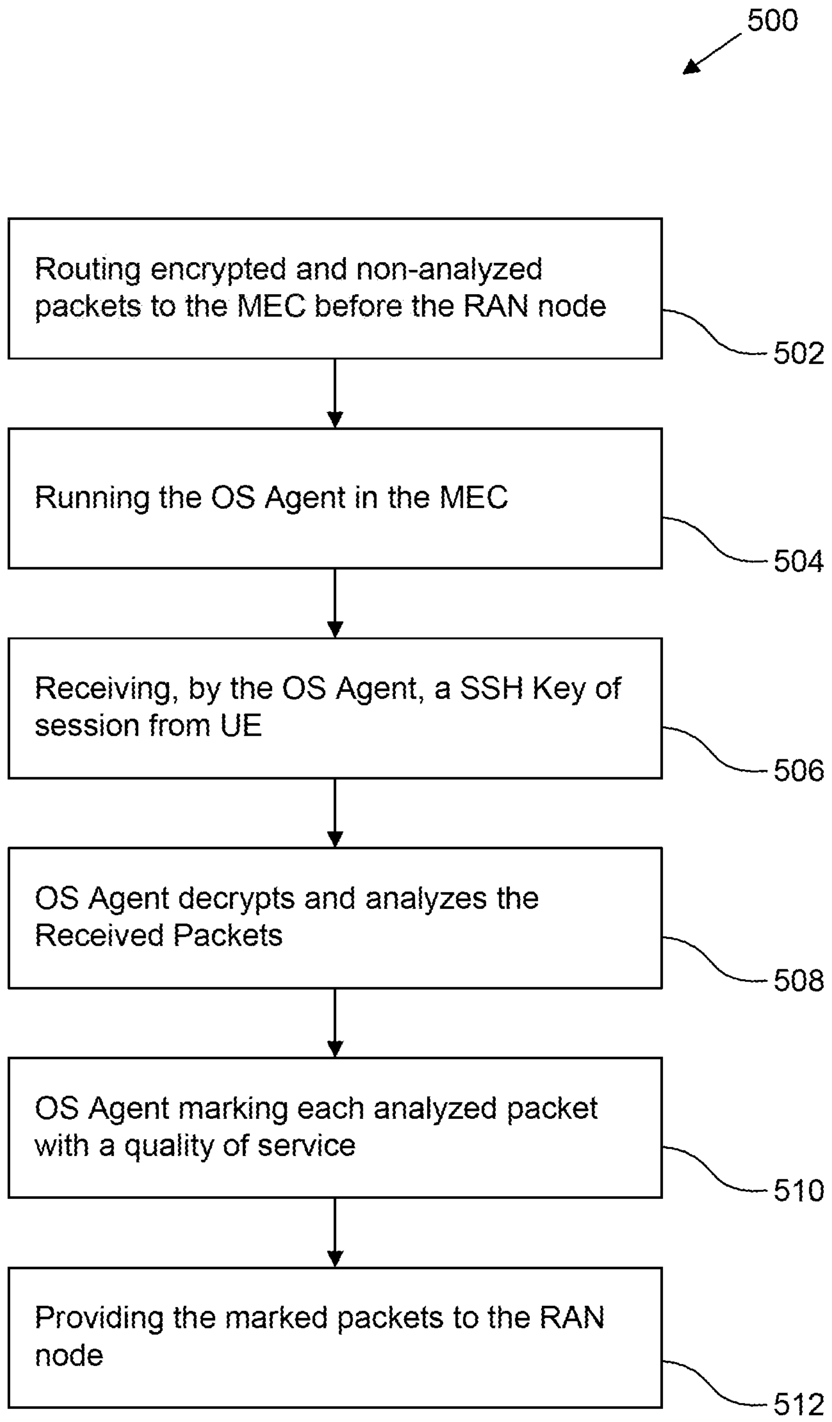
FIG. 5 is an schematic flowchart of an additional embodiment of method the present invention.

As illustrated in FIG. 5, an embodiment 500 of the method for optimizing encrypted connections' transmission OTA between UE and a telecommunication network is shown. This method utilizes the system set out above, namely having an OS agent residing inside of the telecommunication network, wherein the OS agent emulates the UE's OS libraries specific of encrypted protocol. The method comprising routing encrypted and non-analyzed packets to the MEC before the AN 502. The OS Agent begins running in the MEC 504. A SSH Key of session is received by the OS Agent from UE 506. The OS Agent decrypts and analyzes the received packets 508. The OS Agent then marks each analyzed packet with a quality of service 510 before providing the marked packets to the AN 512. The analyzing can be performed by deep packet inspection (DPI). Reordering of PDU's may be performed above the transport layer (TCP).

An additional embodiment allows for a subset of the packets to be decrypted and analyzed in the UE with the remainder of the TCP packets are decrypted an analyzed by the OS agent. The connection of the particular flow/stream is handed over to the OS agent through a control plane signal (RRC) session request. Additional opaque data may be send to the OS agent, to allow synchronization of state.

An additional embodiment allows for the OS agent to decrypte and analyse only the first few packets of a new stream and inform the AN of the associated QCI to use for that stream while not processing the remaining packets of the stream. This is essentially the converse in which the OS agent sends (or causes to be sent) a PDU session modify, which reroutes this flow's traffic from the OS agent directly to the UE (via the AN obviously).

Figure 6:
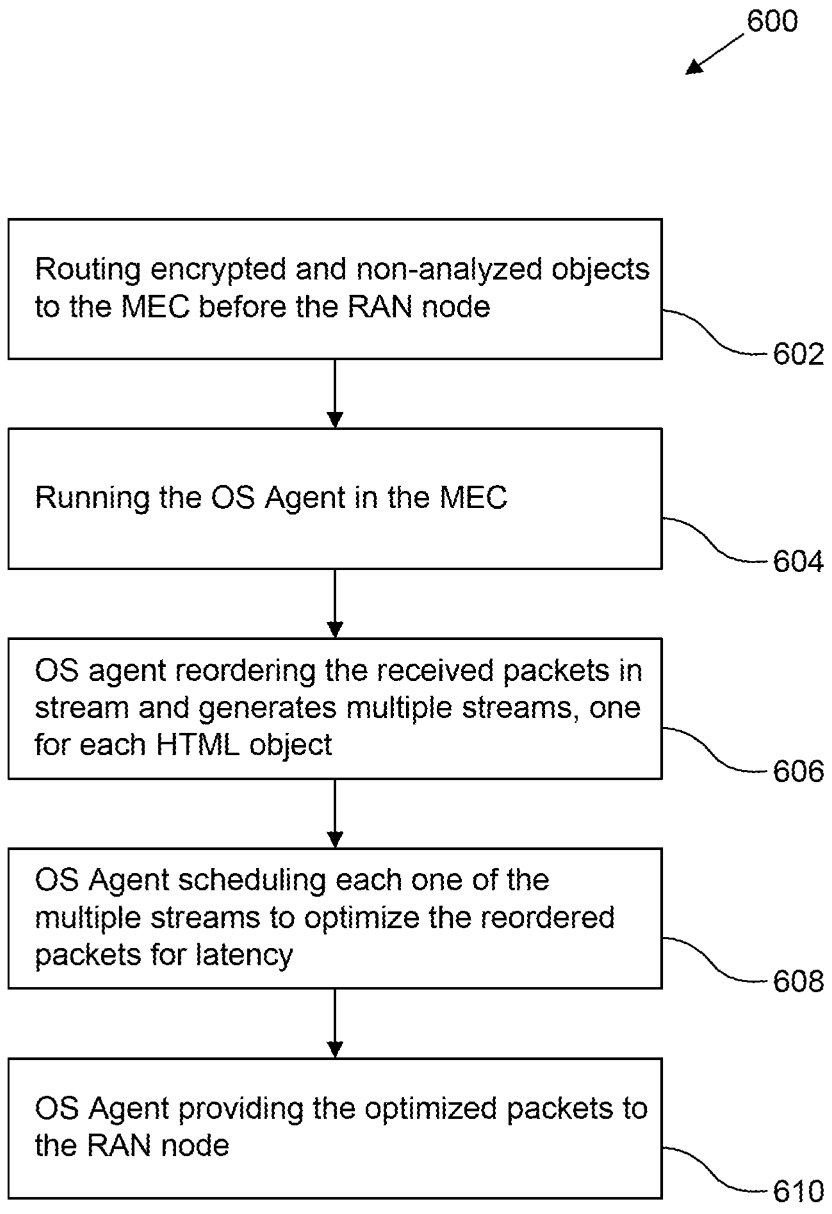
FIG. 6 is an schematic flowchart of an additional embodiment of method the present invention.

As illustrated in FIG. 6, an additional embodiment of the method for optimizing encrypted connections' transmission OTA between UE and a telecommunication network is shown. This method also utilizes the system set out above, namely having an OS agent residing inside of the telecommunication network, wherein the OS agent configured to analyze downlink data to the UE and to provide metadata to the RAN. The method comprising routing non-analyzed packets to the MEC before the AN 602. Running the OS Agent in the MEC 604. By the OS agent, reordering the received packets in stream and generates multiple streams, one for each HTML object 606, scheduling each one of the multiple streams to optimize the reordered packets for latency 608 and providing the optimized packets to the RAN node 610.

Figure 7:
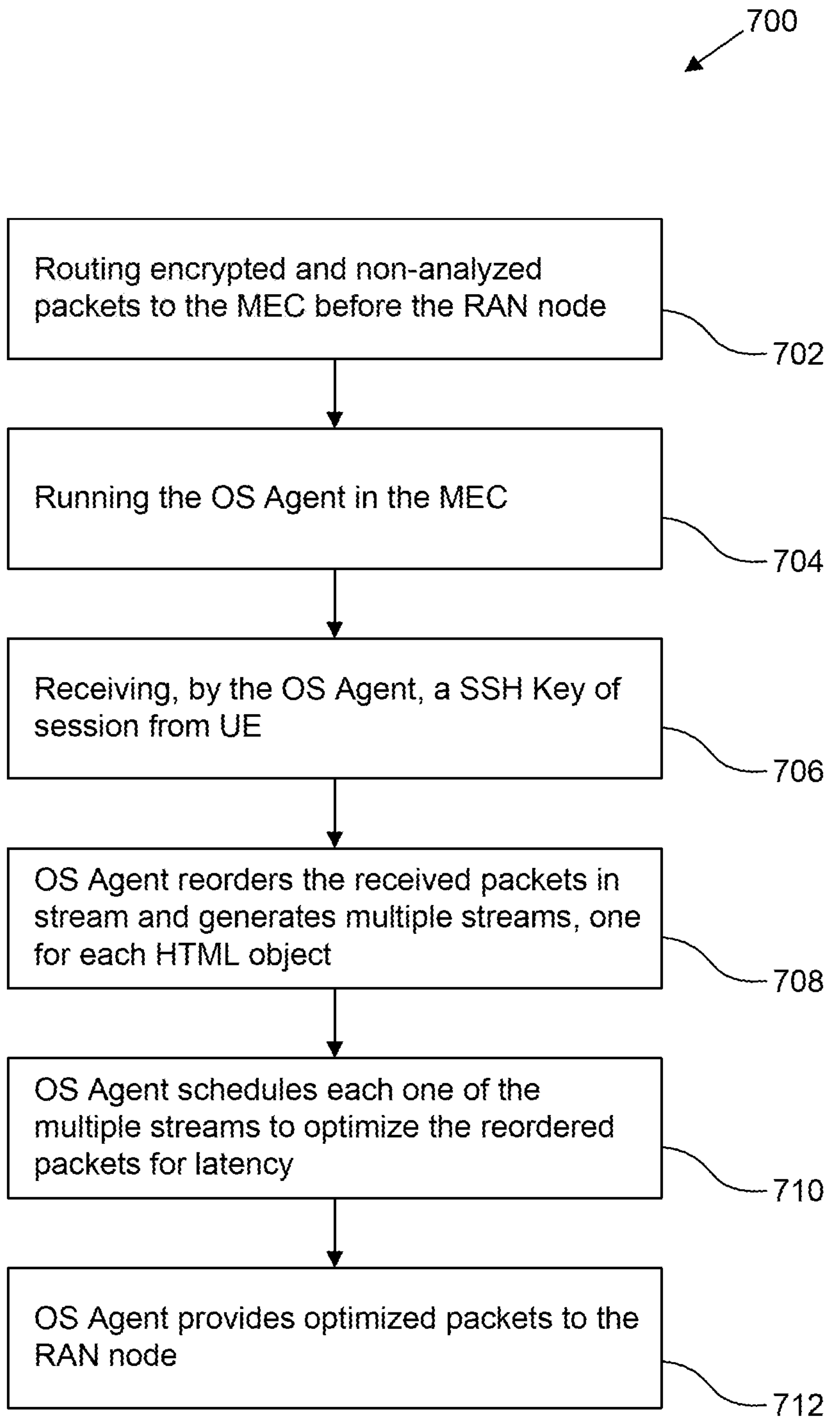
FIG. 7 is an schematic flowchart of an additional embodiment of method the present invention.

As illustrated in FIG. 7, an additional embodiment of the method for optimizing encrypted connections' transmission OTA between UE and a telecommunication network is shown. This method also utilizes the system set out above, namely having an OS agent residing inside of the telecommunication network, wherein the OS agent contains the UE's OS libraries specific of encrypted protocol. The method comprising routing encrypted and non-analyzed packets to the MEC before the AN 702. The OS Agent begin running in the MEC 704. A SSH Key of session is received by the OS Agent from UE 706. The OS Agent reorders the received packets in stream and generates multiple streams, one for each HTML object 708, and then schedules each one of the multiple streams to optimize the reordered TCP packets for latency 710. The optimized packets are provided by the OS Agent to the AN node 712.

Figure 8:
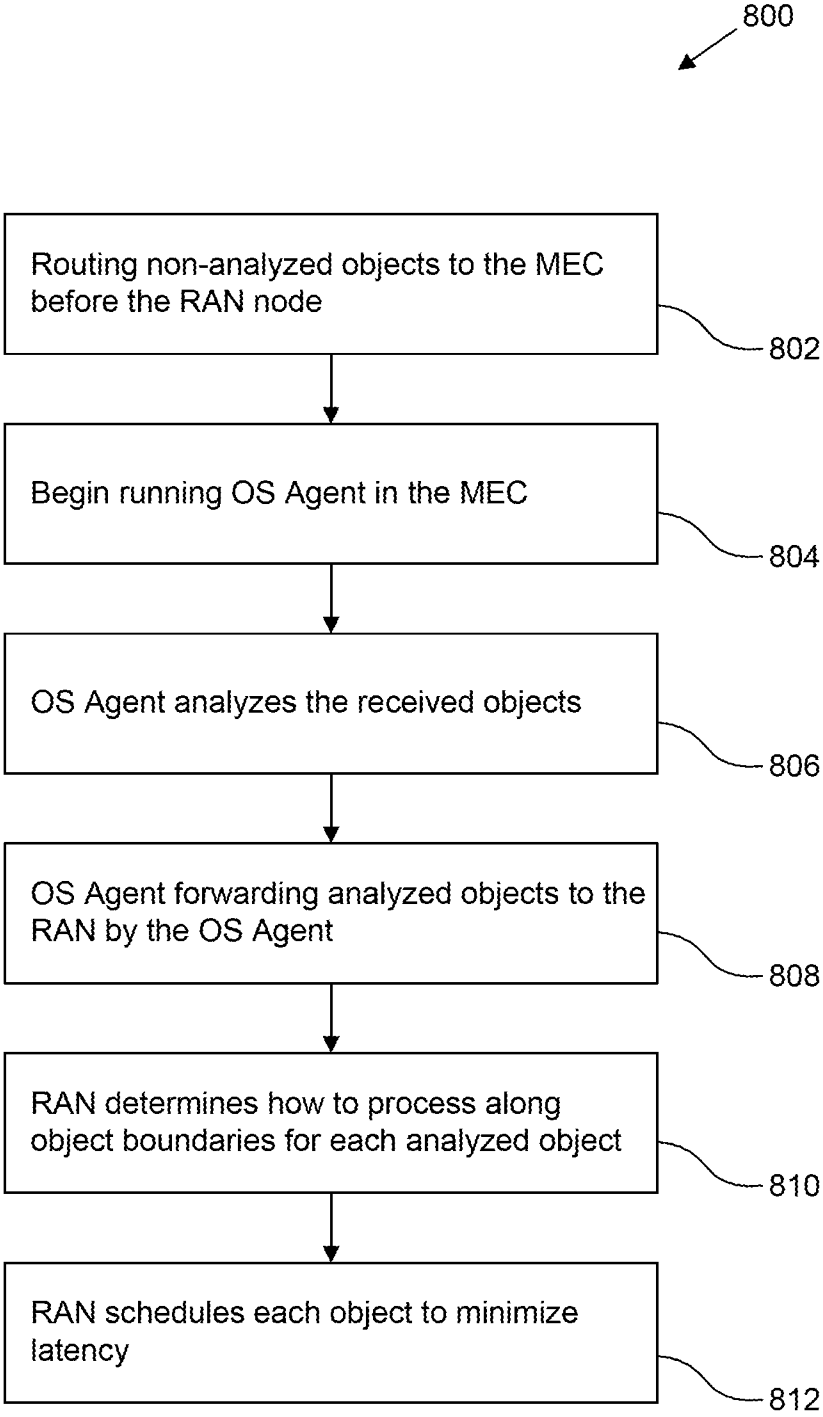
FIG. 8 is an schematic flowchart of an additional embodiment of method the present invention.

As illustrated in FIG. 8, an additional embodiment of the method for optimizing encrypted connections' transmission OTA between UE and a telecommunication network is shown. This method also utilizes the system set out above, namely having an OS agent residing inside of the telecommunication network, wherein the OS agent is configured to analyze downlink data to the UE and to provide metadata of the analyzed data to the RAN. The method comprising routing non-analyzed objects to the MEC before the AN 802. The OS Agent begin running in the MEC 804. The OS Agent analyzes the received objects 806. The analyzed objects are then forwarded to the AN by the OS Agent 808. The RAN determines how to process along object boundaries for each analyzed object 810 and then schedules each object to minimize latency 812. The step of analyzing is performed by deep packet inspection (DPI). The objects in this embodiment can be defined as streams of not fully received objects or as blocks, wherein the interface between the MEC and the RAN may have shared memory.

Figure 9:
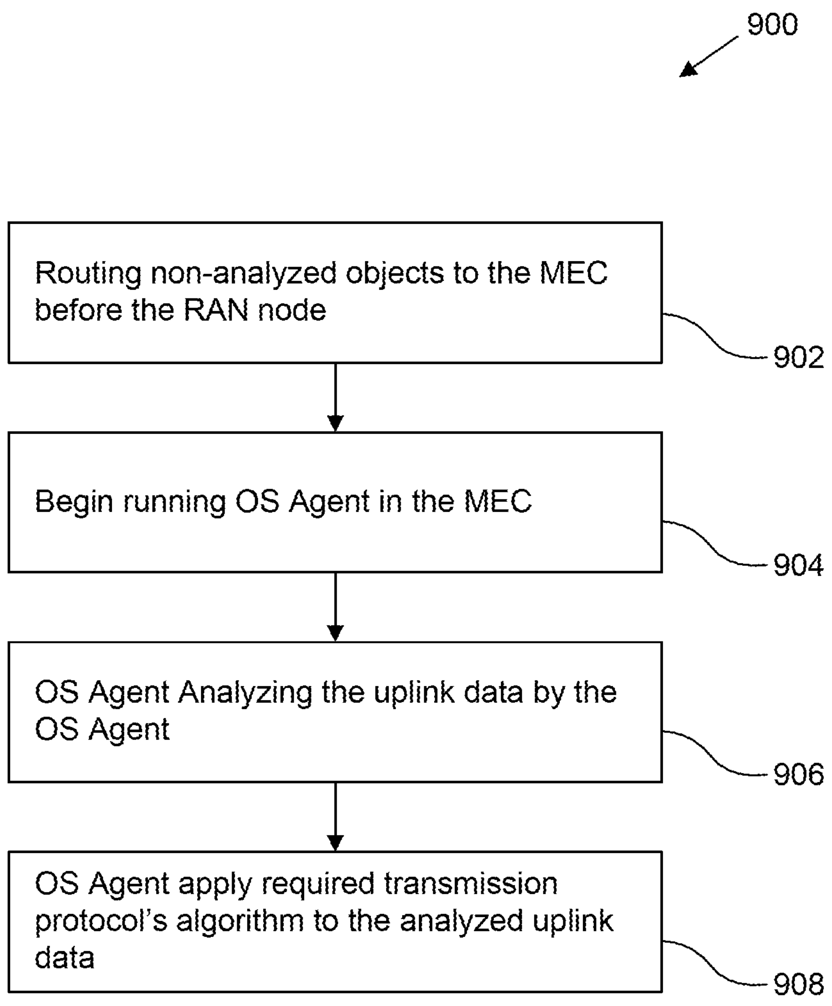
FIG. 9 is an schematic flowchart of an additional embodiment of method the present invention.

As illustrated in FIG. 9, an embodiment 900 of the method for optimizing encrypted connections' transmission OTA between UE and a telecommunication network is shown. This method utilizes the system set out above, namely having an OS agent residing inside of the telecommunication network, wherein the OS agent is configured to analyze uplink data from the UE. The method comprising routing uplink data to the MEC after the AN node 902. The OS Agent begin running in the MEC 904. Analyzing the uplink data by the OS Agent 906. The OS Agent will then will apply required transmission protocol's algorithm, such as pacing, encryption etc., to the analyzed uplink data 908.

An additional embodiment allows for a subset of the packets to be decrypted and analyzed in the UE with the remainder of the packets are decrypted an analyzed by the OS agent.

Figure 10:
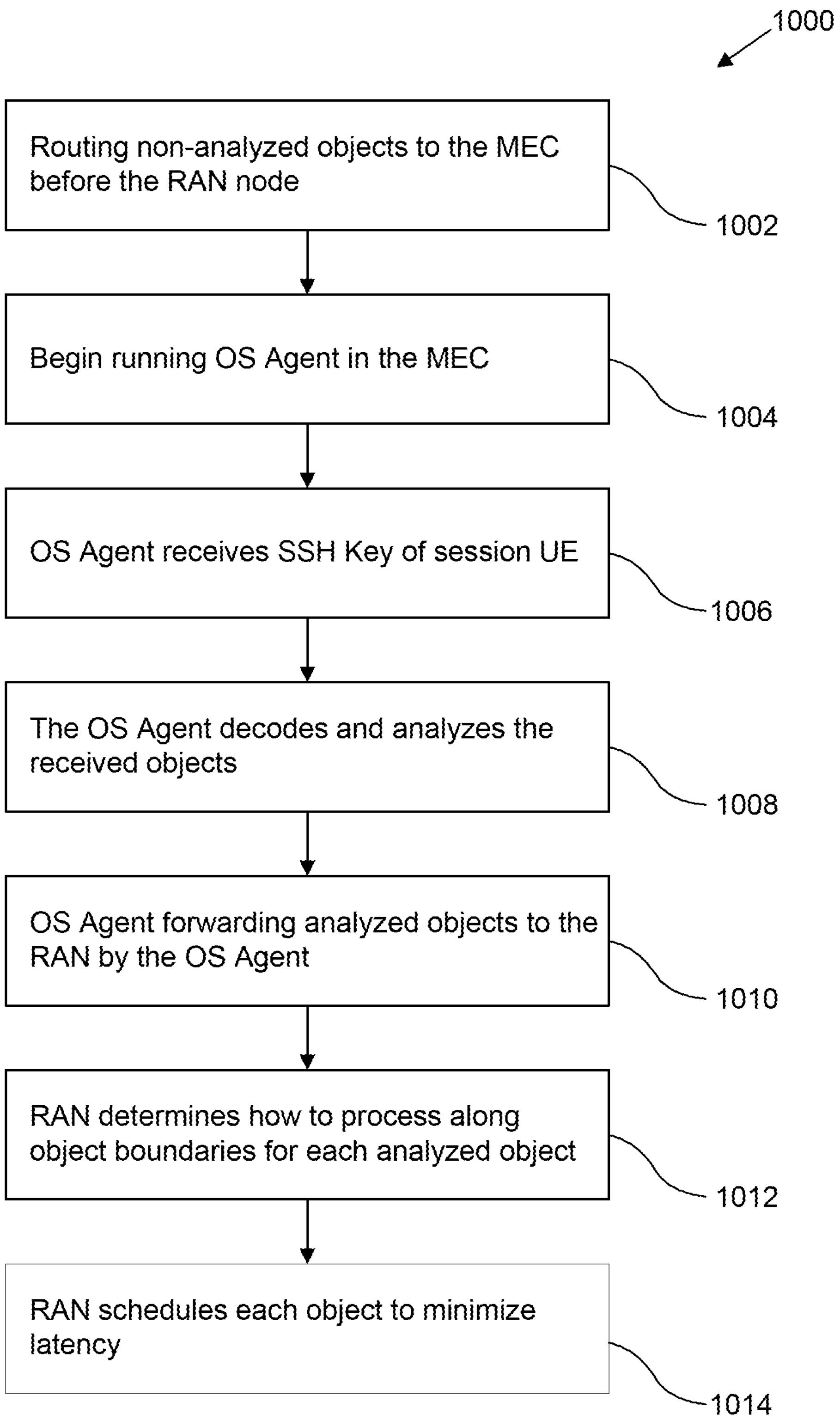
FIG. 10 is an schematic flowchart of an additional embodiment of method the present invention.

As illustrated in FIG. 10, an additional embodiment of the method for optimizing encrypted connections' transmission OTA between UE and a telecommunication network is shown. This method also utilizes the system set out above, namely having an OS agent residing inside of the telecommunication network, wherein the OS agent emulates the UE's OS libraries specific of encrypted protocol. The method comprising routing encrypted and non-analyzed objects to the MEC before the AN node 1002. The OS Agent begins running in the MEC 1004. A SSH Key of session is received by the OS Agent from UE 1006. The OS Agent decodes and analyzes the received objects 1008. The analyzed objects are then forwarded to the AN by the OS Agent 1010. Forwarding of objects may be begin before analysis is complete. The AN determines how to process along object boundaries for each analyzed object 1012 and then schedules each object to minimize latency 1014. The objects in this embodiment can be defined as streams of not fully received objects or as memory blocks, wherein the interface between the MEC and the AN may have shared memory.

As further disclose herein, the present invention further comprises a RAN node residing within a telecommunications network comprising a protocol to be informed of object boundaries and object importance. Further disclosed herein, the present invention comprises a telecommunication network comprising an OS agent residing inside the telecommunication network, wherein the OS agent contains the user equipment OS libraries specific of encrypted protocol.

Further disclosed herein, the present invention comprises a telecommunication network comprising an OS agent residing inside the telecommunication network, wherein the OS agent is configured to interact with a destination node not a source node.

As further disclose herein, the present invention further comprises a UE comprising a module configured to provide a session request leading to the creation of an OS agent residing on the AN side of the OTA interface. Further, the UE can be configured to provide information to an OS agent residing on the AN side of the OTA interface.

As further disclose herein, the present invention further comprises an OS agent that is configured to receive metadata on data transmitted from the UE and provides this metadata to the RAN. The OS agent does not process the data but merely provides a conduit for the UE to provide uplink metadata to the RAN.

As further disclose herein, in some embodiments, the UE triggers the use of the OS agent for chosen data flows. One example involves an established PDU Session from the UE to the OS agent and the utilization of this PDU Session to transfer active flows to be handled by the OS Agent or transferred back to the UE.

In some other embodiments, the UE would request to a Core network function, such as the Session manager, to first forward a given PDU session to the OS Agent, or to transfer it back to the UE. The handover of session may be completely transparent to the network node, i.e. application server) in communication with the UE. This is due to the routing/rerouting being done transparently to the application server.

In some embodiments, the UE may decide to trigger this handover of flows depending on the type of flows, the condition of the network that it monitors, i.e. latency, throughput, OS Agent's performance and capacities and usage, or required security restrictions, i.e. not sharing encryption keys for high security requirements, or the type of objects it wants to exchange with the network node. Reciprocally the OS Agent may trigger the same handovers of session from itself to the UE, either asking the UE via an established communication link between the OS Agent and UE, or via the Core network function, i.e. Session manager or other like function. The OS Agent may trigger such handover when it finds it is lacking resources to manage/analyze the flows or when it determines that it may not provide additional metadata that is beneficial to the RAN.

In some other embodiments, an apparatus for optimizing over the air (OTA) transmission between a user equipment (UE) and a telecommunication network having a radio access network (RAN) node is disclosed. This apparatus comprises an operating system (OS) agent residing on the RAN side of the OTA interface. The OS agent is configured to analyze data for and from the UE and to provide metadata to the RAN. The metadata can comprise object boundaries, relative importance of the object, quality of service marking of individual packets, quality of service marking of flows and/or marking of received packets to which object each received packet belongs. Additionally, the end to end transmissions can be encrypted connections and the OS agent can emulate the UE's OS libraries and configurations specific of encryption protocol. Still further, the apparatus can also comprise a OS raw object interface connecting a OS raw object stream from user equipment to the OS agent.

In some other embodiments, an apparatus for optimizing over the air (OTA) transmission between a user equipment (UE) and a telecommunication network having a radio access network (RAN) node is disclosed. This apparatus comprises an operating system (OS) agent residing on the RAN side of the OTA interface. The OS agent contains the UE's OS libraries and configurations (encryption keys) specific of encryption protocol.

In some other embodiments, an apparatus to optimizing over the air (OTA) transmission between a user equipment (UE) and a telecommunication network having a radio access network (RAN) node is disclosed. The apparatus comprising an operating system (OS) agent residing on the RAN side of the OTA interface. The OS agent is configured to receive packets in a first protocol and translate the received packets into a second protocol.

In some other embodiments, a RAN node residing within a telecommunications network is disclosed. The RAN node comprising a protocol to be informed of object boundaries and object importance.

In some other embodiments, a RAN node is disclosed. The RAN node comprising an operating system (OS) agent residing on the RAN side of the OTA interface. The OS agent is configured to interact with a destination node not a source node.

In some other embodiments, a method for optimizing objects transmitted over the air (OTA) between user equipment (UE) and a telecommunication network is disclosed. The method comprising routing non-analyzed objects to the MEC before the RAN node. An OS Agent begins to run in the MEC. The OS Agent then analyzing each object. The analyzed objects are then forwarded to the RAN, where each analyzed object is then processed based on object boundaries and scheduled to minimize object latency. The analyzing of the objects can be performed by deep packet inspection (DPI). Further the objects can be defined as streams of not fully received objects or as blocks, wherein the interface between the MEC and the RAN may have shared memory.

The OS Agent is capable of handling encrypted objects as the OS Agent can contain the UE's OS libraries specific of encrypted protocol. When encrypted objects are present, the method can also comprise routing the encrypted and non-analyzed objects to the MEC before the RAN node. The OS Agent receives a SSH Key of session from UE, and then decodes and analyzes the received objects.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:

receiving, by an operating system (OS) agent operating on computing hardware of a network entity of a telecommunication network, data packets of a data flow;

analyzing, by the OS agent, the data packets of the data flow;

generating, by the OS agent, metadata for the data flow based on the analysis, the metadata comprising boundaries of objects within the data flow, and at least one of: dependencies between two or more of the objects within said data flow; a relative importance of the objects within said data flow; and priorities of the objects within said data flow, wherein the boundaries of the objects within the data flow include an indication of corresponding pluralities of the data packets that collectively make up each one of the objects within the data flow;

generating, by the OS agent, multiple object streams based on the analysis of the data flow, each one of the multiple object streams comprising the pluralities of the data packets that collectively make up one of the objects within the data flow; and providing, by the OS agent, the multiple object streams and the metadata for the data flow to a radio access network (RAN) node of the telecommunications network for over-the-air transmission.

2. The method of claim 1, wherein the network entity is a mobile edge computing (MEC) server.

3. The method of claim 1, wherein the data flow is a downlink data flow, the OS agent is configurable by a user equipment (UE), and the network entity is an access node of the RAN.

4. The method of claim 3, wherein generating, by the OS agent, the metadata for the data flow based on the analysis comprises marking, by the OS Agent, each data packet with a quality of service indicator, and including the marking in the metadata.

5. The method of claim 1, wherein data flow is an uplink data flow and the network entity is a user equipment (UE).

6. The method of claim 1, wherein receiving the data packets of the data flow comprises receiving data packets that are encrypted using an encryption protocol, and wherein prior to analyzing the data packets, the OS agent, decrypts the encrypted data packets using an encryption key received from a user equipment (UE).

7. The method of claim 6, wherein the encryption protocol is an SSH encryption protocol and the encryption key is an SSH key.

8. The method of claim 1, wherein the data packets of the data flow are Transmission Control Protocol (TCP) data packets or a User Datagram Protocol (UDP) data packets.

9. The method of claim 1, wherein analyzing, by the OS agent, the data packets of the data flow comprises analysis the data packets of the data flow using deep packet inspection (DPI).

10. The method of claim 1, wherein generating, by the OS agent, the multiple object streams further comprises:

reordering, by the OS agent, the pluralities of the data packets in each of the multiple object streams; and scheduling, by the OS agent, each of the multiple objects streams to optimize the OTA transmission of the objects within the data flow.

11. The method of claim 1, wherein the data packets of the data flow are analyzed using deep packet inspection (DPI).

12. A network entity comprising:

a processor;

a memory operably coupled to the processor and storing computer-readable instructions of an operating system (OS) agent of the network entity which, when executed by the processor cause the processor to:

receive data packets of a data flow;

analyze the data packets of the data flow;

generate metadata for the data flow based on the analysis, the metadata comprising boundaries of objects within the data flow, and at least one of: dependencies between two or more of the objects within said data flow; a relative importance of the objects within said data flow; and priorities of the objects within said data flow, wherein the boundaries of the objects within the data flow include an indication of corresponding pluralities of the data packets that collectively make up each one of the objects within the data flow;

generate multiple object streams based on the analysis of the data flow, each one of the multiple object streams comprising the pluralities of the data packets that collectively make up one of the objects within the data flow; and provide the multiple object streams and the metadata for the data flow to a radio access network (RAN) node of the telecommunications network for over-the-air transmission.

13. The network entity of claim 12, wherein the network entity is a mobile edge computing (MEC) server.

14. The network entity of claim 12, wherein the network entity is an access node of the RAN, the data flow is a downlink data flow, and the OS agent is configurable by a user equipment.

15. The network entity of claim 14, wherein the metadata for the data flow generated comprises a quality of service indicator for each data packet in the data flow.

16. The network entity of claim 12, wherein data flow is an uplink data flow and the network entity is a user equipment (UE).

17. The network entity of claim 12, wherein the data packets of the data flow that are received are encrypted using an encryption protocol, and wherein prior to the data packets being analyzed, the encrypted data packets are decrypted using an encryption key received from a user equipment (UE).

18. The network entity of claim 17, wherein the encryption protocol is an SSH encryption protocol and the encryption key is an SSH key.

19. The network entity of claim 12, wherein the data packets of the data flow are Transmission Control Protocol (TCP) data packets or a User Datagram Protocol (UDP) data packets.

20. A non-transitory computer-readable medium storing computer-readable instructions of an operating system (OS) agent of the network entity which, when executed by a processor of a network entity cause the network entity to:

receive data packets of a data flow;

generate metadata for the data flow based on the analysis, the metadata comprising boundaries of objects within the data flow, and at least one of: dependencies between two or more of the objects within said data flow; a relative importance of the objects within said data flow; and priorities of the objects within said data flow, wherein the boundaries of the objects within the data flow include an indication of corresponding pluralities of the data packets that collectively make up each one of the objects within the data flow;

generate multiple object streams based on the analysis of the data flow, each one of the multiple object streams comprising the pluralities of the data packets that collectively make up one of the objects within the data flow; and provide the multiple object streams and the metadata for the data flow to a radio access network (RAN) node of the telecommunications network for over-the-air transmission.

* * * * *